INVENTOR
Robert S. Strimel
Synnestvedt + Lechner
ATTORNEYS

March 5, 1957 R. S. STRIMEL 2,784,048

RECORDING UNIT

Filed April 3, 1953 7 Sheets-Sheet 2

INVENTOR
Robert S. Strimel
Symmestvedt & Lechner
ATTORNEYS

March 5, 1957 R. S. STRIMEL 2,784,048

RECORDING UNIT

Filed April 3, 1953 7 Sheets-Sheet 3

INVENTOR

Robert S. Strimel

Synnestvedt + Lechner

ATTORNEYS

March 5, 1957 R. S. STRIMEL 2,784,048

RECORDING UNIT

Filed April 3, 1953 7 Sheets-Sheet 4

INVENTOR
Robert S. Strimel
Synnestvedt + Lechner
ATTORNEYS

March 5, 1957 R. S. STRIMEL 2,784,048

RECORDING UNIT

Filed April 3, 1953 7 Sheets-Sheet 5

INVENTOR
Robert S. Strimel
Synnestvedt + Lechner
ATTORNEYS

March 5, 1957 R. S. STRIMEL 2,784,048

RECORDING UNIT

Filed April 3, 1953 7 Sheets-Sheet 6

INVENTOR
Robert S. Strimel
Synnestvedt & Lechner
ATTORNEYS

INVENTOR
Robert S. Strimel
Synnestvedt & Lechner
ATTORNEYS

United States Patent Office 2,784,048

Patented Mar. 5, 1957

2,784,048

RECORDING UNIT

Robert S. Strimel, Bridgeport, Pa., assignor to Tinius Olsen Testing Machine Company, Willow Grove, Pa., a corporation of Pennsylvania Application April 3, 1953, Serial No. 346,721

7 Claims. (Cl. 346—32)

This invention relates to a recorder unit and a system for the measurement and registering of engineering data, particularly such variables as stress and strain, rate of stress and strain, temperature and strain, and the like.

The registering mechanism disclosed herein serves the functions of measuring, indicating and recording, and the term "registering" may be considered as including any one of said functions.

One of the principal objects of the present invention is to provide a particularly shaped apparatus which may be attached to a standard drum type recorder. The apparatus has a pen and mechanism for driving the pen over chart paper attached to the drum, constructed and arranged to result in a small, compact, highly accurate recording unit having a wide range of application, especially where records are to be made of any two variables or changes in condition.

While the apparatus of the present invention may be desirably utilized with any of the standard drum type recorders, I prefer to use the apparatus with the novel drum type recorder disclosed in my copending application, Serial No. 261,239, filed December 12, 1951, and assigned to the assignee of the present invention. Although the apparatus is a recorder as that word is known in the art, the term "apparatus" is used in the description for the sake of clarity.

Drum type recorders are usually constructed with a box-like housing, the front of the housing having a slanting opening in which is disposed a rotatable drum. The top and back of the housing are aligned at right angles with one another, consequently forming an L-shaped surface.

The apparatus of the present invention contemplates a generally L-shaped housing or casing which is adapted to fit over and be attached to the L-shaped surface of the recorder. A recording pen is disposed at the front of the casing being mounted on a movable wire which operates over two pulleys secured to the casing and located at opposite sides of the drum so that the pen moves between the pulleys over the surface of the chart attached to the drum. The casing encloses a drive system for the wire, and a portion of the casing above the pen incorporates a central control station having certain knobs which control the drive system.

The drive system for moving the wire and pen is electrically similar to the system for driving the drum disclosed in my above referred to copending application.

The system incorporates a two-phase servomotor which serves as the motive source, one phase of the motor being energized from a 60 cycle commercial line and the other phase which controls the operation of the motor being energized through a null circuit.

The null circuit comprises a plurality of transducers or differential transformers, the output voltages of the secondary windings of which are offset against one another to provide a null, i. e., a balanced voltage condition. Thus, a control transducer is associated with the article or device under test and develops a signal or voltage in accordance with the information desired. A plurality of selectively operable transducers (preferably three) are associated with the drive means for the pen, the output voltages of these transducers being proportional to the linear displacement of the pen and out of phase with the signal voltage. The signal and balancing voltages are compared and any difference in magnitude is amplified and fed to the control phase of the servomotor, which operates to move the pen. The motor operates until the two voltages balance.

The system incorporates two principal features—one is that the stress indication may be magnified by merely turning a control knob, and the other is that the pen and balancing transducer cores have a common drive shaft by which they are interconnected to the servomotor shaft. This latter arrangement makes for an extremely accurate synchronization of pen and balancing transducer core displacement.

Although the description of the apparatus is given in terms of magnification of stress indication, it will be understood that this feature permits the pen to indicate changes in range of stress.

Each end of the wire on which the pen is secured is respectively attached to a pulley, which is fixed to a drive shaft. The cores of the balancing transducers are also mechanically linked with this same common drive shaft, which is interconnected to the servomotor shaft.

In the arrangement, no gearing is used between the common shaft and the pen and transducer cores. Thus, the possibility of pen displacement not being in accordance with the displacement of a balancing transducer core is reduced to an absolute minimum, since no backlash errors are possible.

In the preferred scheme, three balancing transducers are used, and these may be connected in or out of the null circuit by manipulating a selector switch on the central control panel. The mechanical linkage between the balancing transducer cores and the common drive shaft is such that as the shaft rotates, the cores are displaced different amounts and, accordingly, develop different voltages. Thus, for any given signal from the control transducer the pen will be differently displaced in accordance with the particular balancing transducer connected in the null circuit. This provides for different magnification of the data to be indicated with the change in magnification being easily accomplished by turning a knob.

The null circuit may also incorporate a zeroing transducer whose core may be manually operated by turning a knob on the central control station. The zeroing transducer provides a means to zero-adjust the pen.

With the above-described combination, both the recorder and apparatus being adapted to receive and indicate independent signals, a wide variety of data may be recorded. For example, when an article is being stressed, the drum may be rotated in accordance with the strain, while the pen may be moved in accordance with the stress, or both the pen and drum may be responsive to strain in an article, for example, the strain in flexure and the strain in compression. Also, the pen may be moved in accordance with the rate at which load is being applied to the article while the drum is rotated in accordance with strain. The unit may be adapted in those instances where a record of unit strain v. total strain is desired. So, too, a record of temperature v. strain may be recorded.

In addition to the above, the unit may be utilized in conjunction with a standard testing machine that has mechanism to move an additional pen across the drum. Thus, a record of stress v. strain v. strain or the like may be recorded.

The manner in which the foregoing is accomplished will be apparent from the description and drawings wherein.

Figure 1:
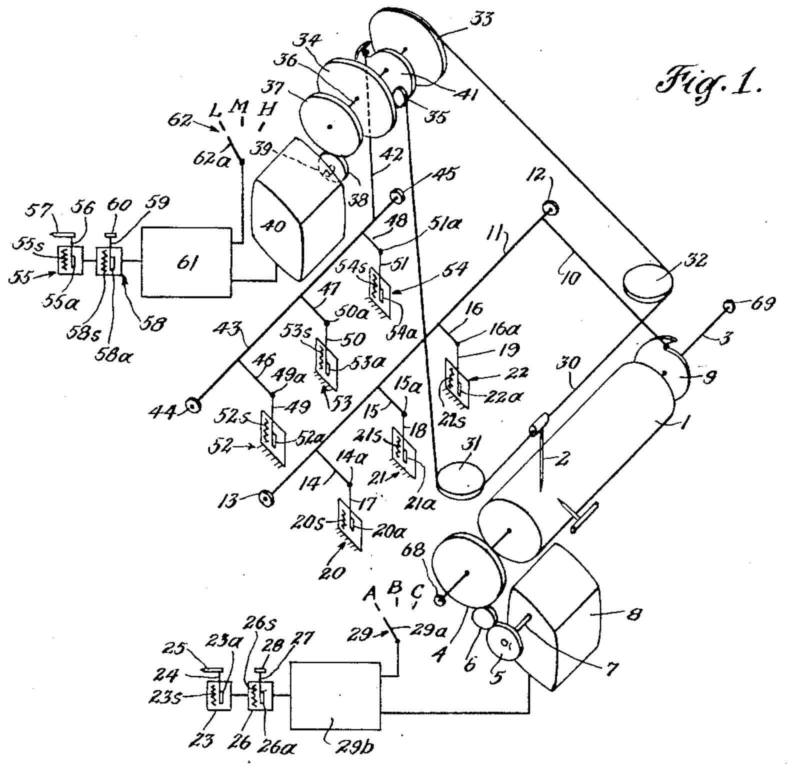
Figure 1 is a schematic view illustrating certain components of the invention.

The over-all arrangement of certain components of the invention is shown in Figure 1 wherein numeral 1 indicates a rotatable drum and numeral 2 indicates a pen which is adapted to move axially across the surface of the drum and ink chart paper attached thereto. The drum and the drive mechanism therefor are enclosed within a recorder such as disclosed in my copending application. The mechanism which drives the pen is enclosed within the L-shaped apparatus which is adapted to fit over the recorder.

While the material which follows describes the rotation of the drum in response to the strain of the article, and the movement of the pen in response to the stress being applied, it will be understood that the pen could be driven in accordance with strain and the drum in accordance with stress. Indeed, these elements can be driven in accordance with any variable capable of producing a control signal.

I will first generally describe the drum and its drive mechanism.

The drum 1 is mounted on a shaft 3, to which is attached driven gear 4, which is rotated by gear 5 through idler 6. The gear 5 is attached to the shaft 7 of servomotor 8.

A cam 9 is also secured to the shaft 3. One end of the cam follower 10 rides on the cam surface while the other end of the follower is secured to a rod 11 pivoted at 12 and 13. Also secured to the rod 11 are operating arms 14, 15 and 16, which are respectively secured to core stems 17, 18 and 19 by pivots **14*a*, 15*a* and 16*a*. The core stems are respectively secured to cores 20*a*, 21*a* and 22*a* of balancing transducers or control elements 20, 21 and 22. The transducers have secondary windings generally indicated by 20*s*, 21*s* and 22*s***.

As the drum is rotated, the cam follower 10 rotates the rod 11 and the operating arms 14, 15 and 16. Since the pivot connections **14*a*, 15*a* and 16*a* are spaced different radial distances from the axis of rod 11**, the transducer cores will be displaced in different amounts and different voltages will be developed across the secondary windings.

It will be observed that the drum and the balancing transducer cores are both connected to a common drive shaft 3. No gearing is used and the arrangement makes for very accurate synchronization of drum rotation and core displacement. While other schemes may be used to interconnect the balancing transducer cores and the drum to the servomotor, the above arrangement is preferred for the reasons indicated.

The signal transducer or control element is generally indicated by the numeral 23 and has core **23*a* and secondary windings 23*s*. The core stem 24 is connected to arm 25, which is displaced in accordance with the strain of the article under test. Thus, the core 23*a*** is displaced in accordance with strain and a voltage proportional to strain is developed across the secondary windings.

The zeroing transducer is generally indicated by the reference numeral 26 and has core **26*a* attached to stem 27 and secondary winding 26*s*. The core may be displaced in accordance with the rotation of the knob 28**. A voltage is developed across the secondary windings which is utilized to accurately set the drum to zero position.

The manner in which the transducers, the amplifier **29*b* and the coils of the servomotor 8 are connected in the null circuit will be explained hereinafter, but now it is mentioned that the secondary windings of the balancing transducers are selectively connected in the null circuit by manipulation of switch 29. The switch has three positions, A, B and C, which respectively correspond to transducers 22, 21 and 20. The arrangement provides for magnification of the strain indication by merely turning the control knob 29*a* of selector switch 29. For example, where the switch is at position A and transducer 22 is connected in the circuit, the drum will be rotated to a certain angular position. If the switch is then turned to position C, the balancing transducer 20** will be connected in the circuit and the drum will rotate to another position, thus magnifying the strain indication.

The pen and its drive mechanism will next be generally described.

The pen 2 is mounted on a wire 30, which is supported by two pulleys 31 and 32 respectively disposed at opposite ends of the drum. One end of the wire is secured to pulley 33, while the other end is secured to pulley 34 through pulley 35. The pulleys 33 and 34 are fixedly secured to common drive shaft 36, which has a gear 37 meshing with gear 38 attached to shaft 39 of servomotor 40.

A cam 41 is also secured to the common drive shaft 36. One end of the cam follower 42 rides on the cam surface while the other end of the follower is secured to a rod 43 pivoted at 44 and 45. Also secured to the rod 43 are operating arms 46, 47 and 48, which are respectively secured to core stems 49, 50 and 51 by pivots **49*a*, 50*a* and 51*a*. The core stems are respectively secured to cores 52*a*, 53*a* and 54*a* of balancing transducers or control elements 52, 53 and 54. The transducers have secondary windings generally indicated by 52*s*, 53*s* and 54*s***.

When the servomotor is rotated, the pen is moved over the surface of the drum by means of the linkage described. It will be seen that as the pen is moved, the cam follower 42, by running over the surface of cam 41, rotates the rod 43 and operating arms 46, 47 and 48. Since the pivot connections **49*a*, 50*a* and 51*a* are spaced different radial distances from the axis of rod 43**, the transducer cores will be displaced in different amounts and different voltages will be developed across these secondary windings.

It will be noted that the wire and pen and the balancing transducer cores are both connected to the common drive shaft 36 wtihout the use of gears. This is an important part of the invention, since accurate synchronization of pen and core displacement is obtained. Greater accuracy is enhanced as no backlash errors are possible. While other schemes may be used to connect the pen and the balancing transducer cores to the servomotor, the described arrangement is preferred.

The stress signal transducer or control element is generally indicated by the numeral 55 and has core **55*a* and secondary winding 55*s*. The core stem 56 is connected to an arm 57, which is displaced in accordance with the stress of the article under test. Thus, the core 55*a*** is displaced in accordance with stress and voltage proportional to stress is developed across the secondary winding.

The zeroing transducer is generally indicated by the numeral 58 and has core **58*a* attached to stem 59 and secondary winding 58*s*. The core may be displaced in accordance with the rotation of knob 60**. A voltage is developed across the secondary winding which is utilized to accurately set the pen to zero position.

The manner in which the transducers, the amplifier 61 and the coils of the servomotor 40 are connected in the null circuit will be described hereinafter. However, it may be mentioned that the secondary windings of the balancing transducers are selectively connected in the null circuit by manipulation of switch 62. The switch has three positions, L, M and H, which respectively correspond to transducers 54, 53 and 52. The arrangement provides for magnification of the stress indication by merely turning the knob 62a of selector switch 62. For example, where the switch is in position L and transducer 54 is connected in the circuit, the pen will be displaced to a certain position along the surface of the drum. If the switch is then turned to position H, the balancing transducer 52 will be connected in the circuit and the pen will be displaced to another position along the surface of the drum, thus magnifying the stress indication.

Having described the general over-all arrangement of the invention, the details of construction will be next explained.

Figure 2:
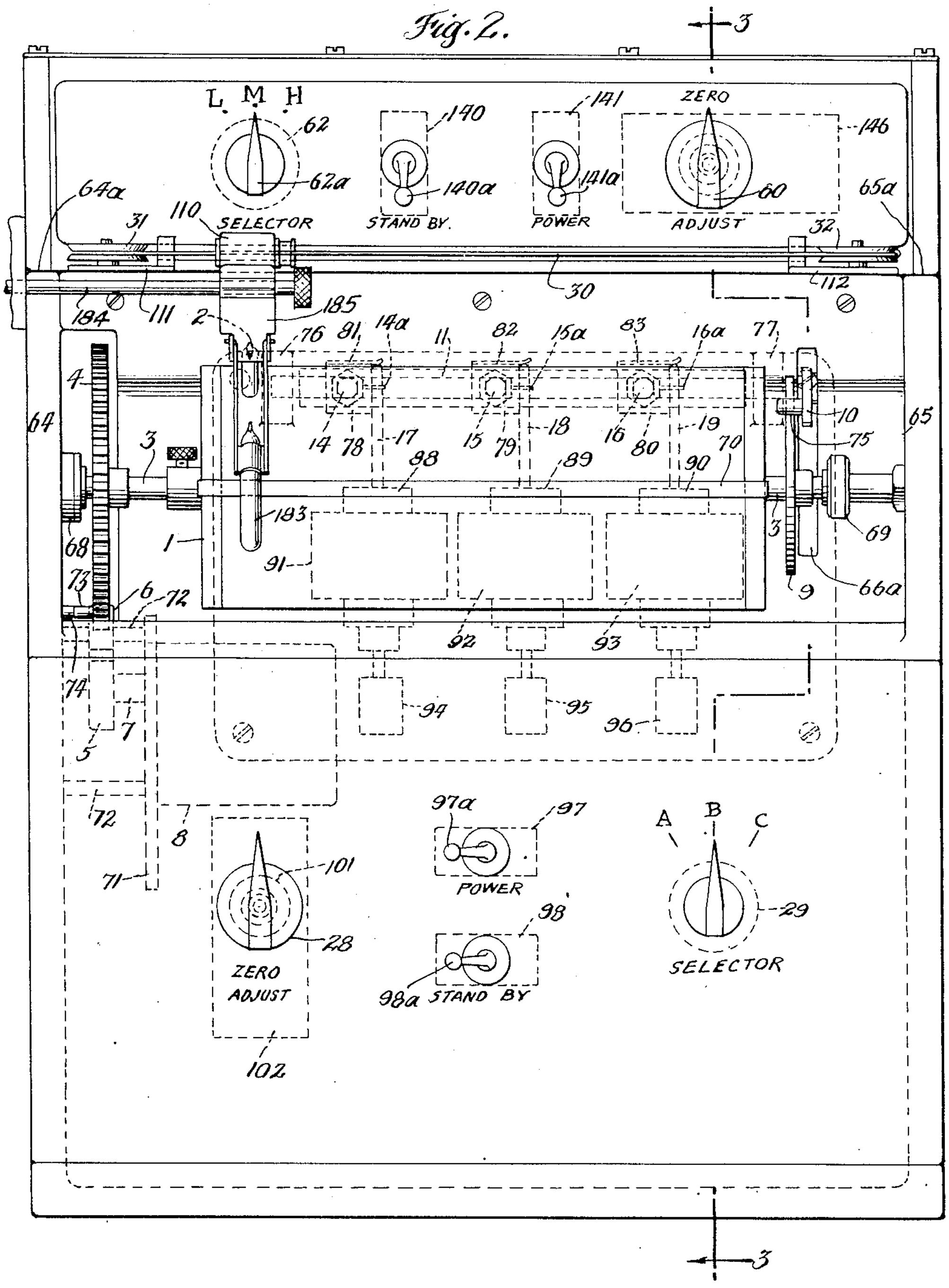
Figure 2 is a front elevational view of a device constructed in accordance with my invention looking toward the right as viewed in Figure 3.
Figure 3:
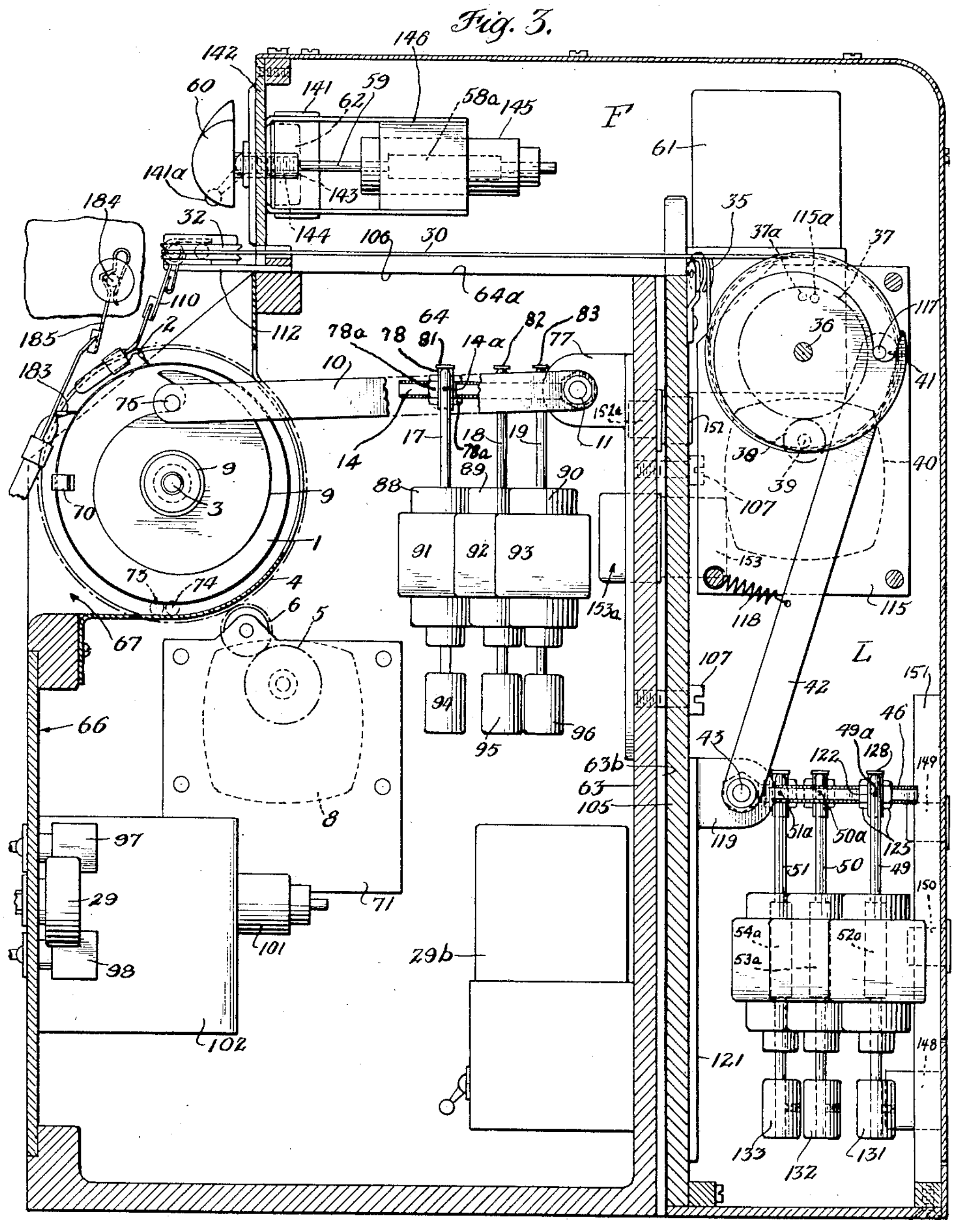
Figure 3 is a cross section of the device taken substantially on the line 3—3 of Figure 2.
Figure 5:
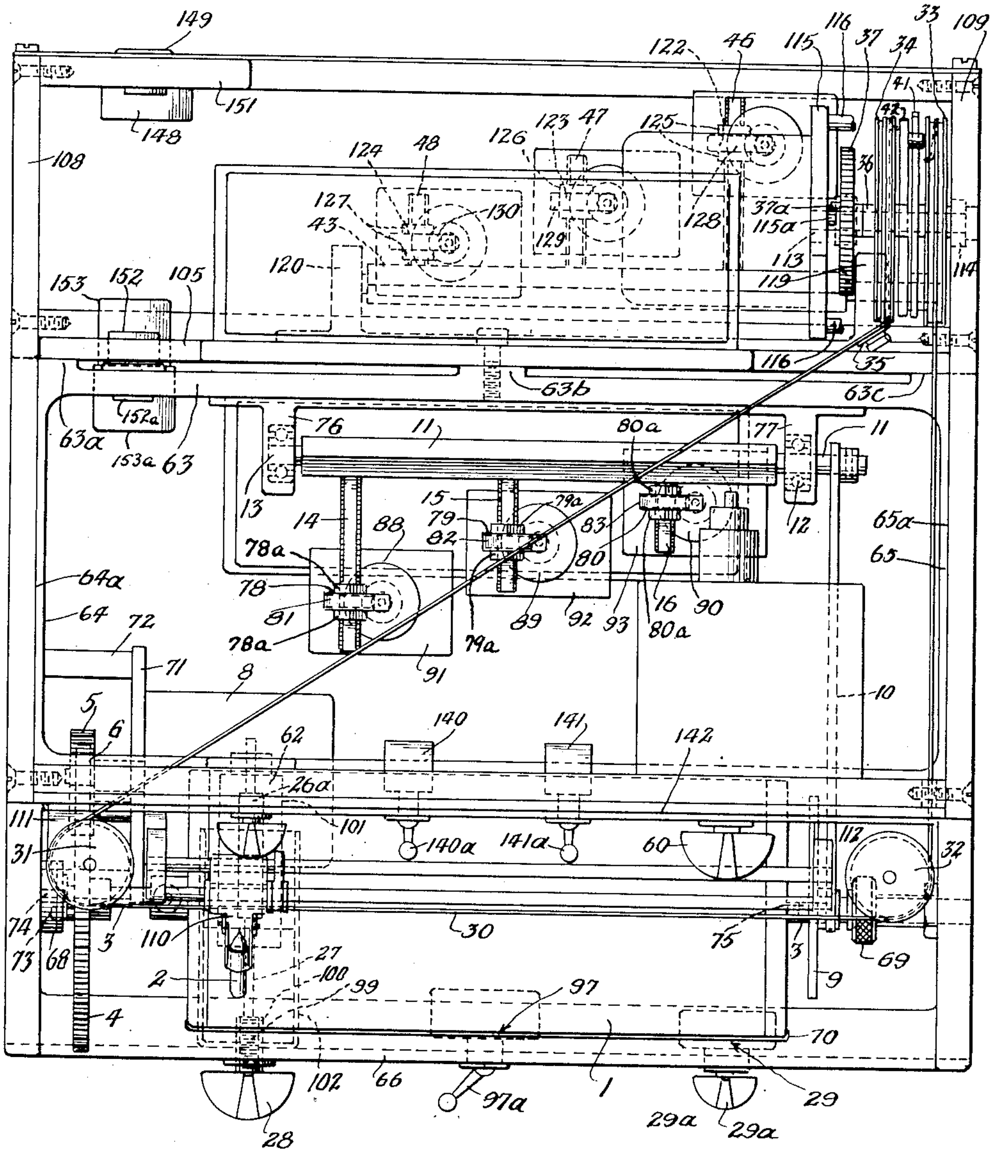
Figure 5 is a plan view looking downwardly as viewed in Figure 2.

The recorder over which the L-shaped apparatus is adapted to fit is shown in Figures 2, 3 and 5.

The recorder has a back plate generally indicated by the numeral 63 with ledges 63a, 63b and 63c, the ledges forming the abutment surfaces to which the leg L of the L-shaped apparatus is secured. The top surfaces 64a and 65a of sides 64 and 65 form the abutment surfaces on which the foot F of the L-shaped apparatus is engaged. The front plate of the recorder, generally indicated by the numeral 66, has an open space 67, in which the drum 1, secured to the shaft 3, is mounted by pivot arrangements 68 and 69. Recording or chart paper may be secured to the drum as by clip 70. The gear 4 is secured to the shaft 3 and meshes with pinion 6, which engages the drive gear 5 secured to shaft 7 of the servomotor 8, the servomotor being mounted on a plate 71, which is secured to side 64 by legs 72—72. The gear 4 has a pin 73, which is adapted to engage with pin 74 mounted on the side 64 to prevent overtravel of the drum.

At the other end of shaft 3 is secured cam 9, the surface of which engages pin 75 of cam follower 10. The cam follower 10 extends backwardly through a recess 66a in the front plate and is fixedly secured to rod 11, which is mounted on pivots 12 and 13 disposed in outwardly extending members 76 and 77 fixed to the back plate 63. As the shaft 3 is moved to rotate the cam 9, the cam follower 10 will be actuated to rotate the rod 11.

Secured to the rod 11 are threaded operating arms 14, 15 and 16. The blocks 78, 79 and 80 are provided with square holes and are adapted to slide on the respective operating arms. The blocks may be secured in any desired position by manipulating the nuts 78a—78a, 79a—79a and 80a—80a. This arrangement provides for a wide variety of magnification changes. The blocks respectively carry springs 81, 82 and 83, which interengage the top of the stems 17, 18 and 19, and firmly but yieldingly hold the stems on the pivots 14a, 15a and 16a. The weights 94, 95 and 96 are respectively attached to stems 17, 18 and 19, and for the purpose of the weights is to assist in the proper suspension of the stems and cores on the pivots.

The primary and secondary windings of the transducers are secured within porcelain housings 88, 89 and 90, which are respectively attached to supports 91, 92 and 93, which are secured to the back plate 63 by means not shown.

It will be apparent that as the rod 11 is rotated, the stems 17, 18 and 19 will be displaced different amounts since they are located at different radial distances from the center of the rod.

The control panel for the recorder is best seen in Figure 2 and it includes the selector switch 29, power switch 97 having lever 97a, standby switch 98 having lever 98a, and zero adjust knob 28. The selector, the standby and the power switches are mounted on the front panel 66 in the manner indicated in Figure 5. The zero adjust control knob 28 is secured to a threaded shaft 99 which operates in a threaded bushing 100. The shaft is secured to stem 27, which carries the core 26a. This arrangement provides for displacement of the core as the knob 28 is rotated. The insulated housing 101 carries the secondary windings 26s. The housisng is attached to U-shaped bracket 102, which is secured to the front plate 66.

The amplifier for the drum null circuit is designated by the numeral 29b (Figure 3) and the manner in which this is used will be taken up more in detail hereinafter.

The details of the construction of the L-shaped apparatus will now be described.

The apparatus has a leg portion generally designated by L and a foot portion designated by F and is generally box-like in construction. As best seen in Figures 3 and 5, the leg L has a portion 105 which is adapted to abut the ledges 63a, 63b and 63c, while the foot F has a portion 106 which is adapted to abut the surfaces 64a and 65a. When the two parts are in engagement, they are held together as by screws 107—107. With reference to Figure 5, it will be observed that the sides 108 and 109 of the leg L also abut the ledges 63a and 63c.

As seen in Figure 2, the pen 2 is secured to wire 30 by adapter mechanism 110. (The purpose of pen 183 secured to rod 184 by adapter 185 will be explained later.) The wire runs over pulleys 31 and 32, which are respectively attached to the foot F by brackets 111 and 112. As viewed in Figure 5, one end of the wire runs back and is secured to pulley 33. The other end of the wire runs from pulley 31 crosswise through the foot F over pulley 35 and thence downwardly where it is connected to pulley 34. The pulleys 33 and 34 are respectively secured to common drive shaft 36, which is supported on bearings 113 and 114. The bearing 113 is supported on plate 115, which is attached to the side 109 by legs 116—116, while the bearing 114 is supported in the side 109. The pulleys rotate in unison with the shaft and the arrangement is such that as the wire unwinds from one pulley, it winds up on the other, or vice versa when the direction of rotation of the shaft is reversed.

The gear 37 is also secured to the common drive shaft 36 and meshes with gear 38, which is secured to the shaft 39 of servomotor 40. The servomotor is supported on plate 115. The gear 37 carries a pin 37a which is adapted to engage pin 115a mounted on plate 115 to prevent overtravel of the pen.

The cam 41 is also secured to common drive shaft 36. The pin 117 of the cam follower 42 is held in engagement with the surface of the cam by spring 118, one end of which is secured to plate 115 and the other to the cam follower. The cam follower is fixedly secured to rod 43, which is mounted in pivots 44 and 45 disposed in outwardly extending members 119 and 120 attached to plate 121, which is secured to the back portion 105.

Figure 4:
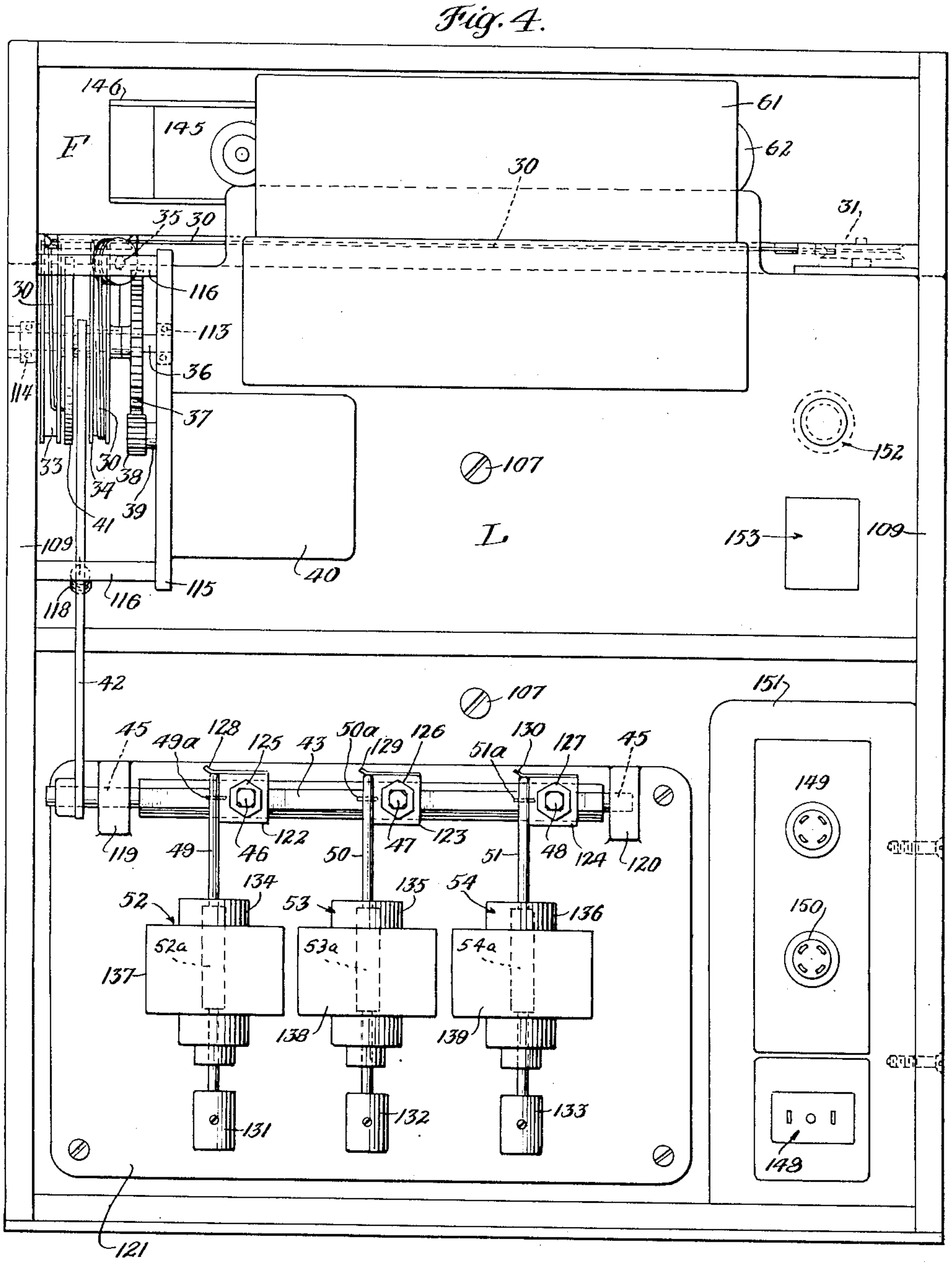
Figure 4 is a rear elevational view looking toward the left as viewed in Figure 3.

The rod 43 carries threaded operating arms 46, 47 and 48 (Figures 3–5). The blocks 122, 123 and 124 are provided with square holes and are adapted to slide on the respective operating arms. The blocks may be secured in any desired position by manipulating the nuts 125—125, 126—126 and 127—127. This arrangement provides for a wide variety of magnification changes. The springs 128, 129 and 130 are respectively attached to blocks 122, 123 and 124 and bear on stems 49, 50 and 51 to hold the stems on the pivots 49a, 50a and 51a. The weights 131, 132 and 133 are respectively attached to stems 49, 50 and 51 and the purpose of these weights is to assist in the proper suspension of the stems and cores on the pivots. The primary and secondary windings of transducers 52, 53 and 54 are disposed within insulated housings 134, 135 and 136, which are secured in blocks 137, 138 and 139 attached to the plate 121.

On the front part of the foot F is the central control station which includes the selector switch 62, standby switch 140 having lever 140*a*, power switch 141 having lever 141*a*, and zero adjust knob 60. The selector, the standby and the power switches are mounted on the front panel 142 in the manner indicated in Figure 3. The zero adjust control knob 60 is secured to a threaded shaft 143, which operates in a threaded bushing 144 mounted in plate 142. The shaft is secured to stem 59, which carries the core 58*a*. This arrangement provides for displacement of the core as the knob 60 is rotated. The insulated housing 145 carries the primary and secondary windings. The housing is attached to U-shaped bracket 146, which is secured to the front panel 142.

The amplifier for the pen null circuit is designated by the numeral 61 and the manner in which this is used will be taken up more in detail hereinafter.

With reference to Figure 4, a standard female receptacle 148 is provided for plugging the unit into a 60 cycle commercial line. The standard female jack plugs 149 and 150 are utilized respectively for receiving the signal from the strain transducer 23 and the stress transducer 55, the two jack plugs and the receptacle being mounted on a plate 151.

The terminals of the jack plug 149 are electrically interconnected to terminals of the male jack plug 152 and the terminals of the receptacle 148 are electrically interconnected to the terminals of the male receptacle 153, the jack plug 152 and receptacle 153 being used to transmit power to the recorder unit. With reference to Figures 3 and 5, it will be seen that the recorder is provided with a female receptacle 153*a* and a female jack plug 152*a* for making the required electrical connections.

Figure 3A:
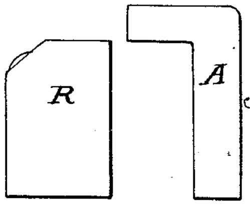
Figure 3a is an exploded view showing certain components of the invention.

In those instances where the receptacle and jack plug on a standard recorder are not located in a desirable position, it is only necessary to relocate these elements so that the L-shaped apparatus may be used therewith. The manner in which the L-shaped apparatus is adapted to fit over a standard recorder is somewhat diagrammatically shown in Figure 3*a*, where the recorder is designated by R and the apparatus by A.

Figure 6:
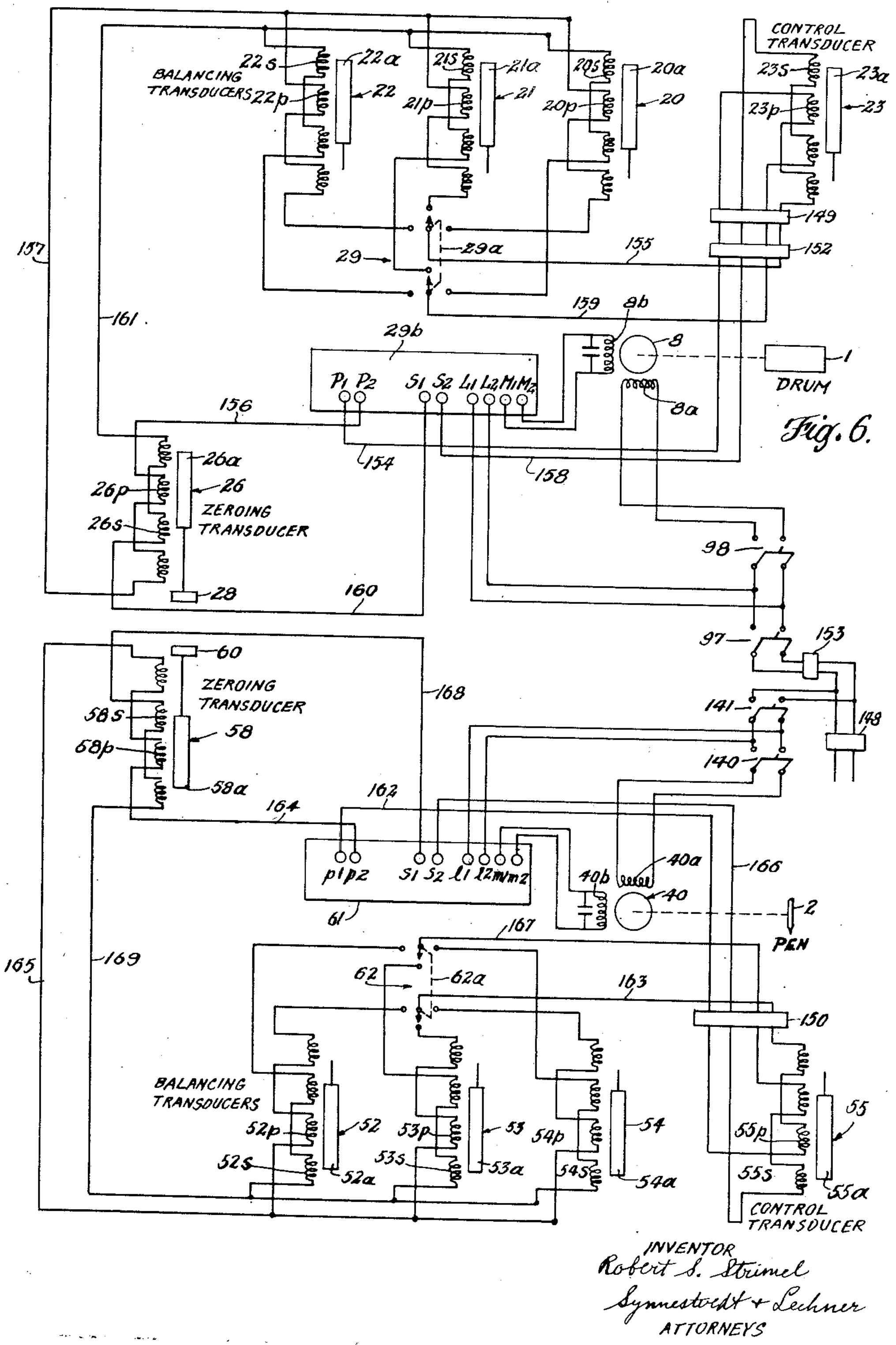
Figure 6 is a wiring diagram.

A schematic diagram of the circuitry employed in the present invention is shown in Figure 6.

The circuits utilized in connection with the drum will be described first.

Commercial power is supplied through receptacle 148, thence through receptacle 153 to power switch 97. When the switch 97 is closed, power is fed to terminals L–1, L–2 on the amplifier 29*b*. When the standby switch is closed, power is fed to coil 8*a* of servomotor 8.

Power from terminals L–1, L–2 is fed through a stepdown transducer (not shown) to terminals P–1, P–2, which supply a constant voltage to the primary windings of the various transducers. Terminal P–1 is interconnected through conductor 154, jack plugs 152 and 149, to the primary windings 23*p* of control transducer 23. The other side of these primary windings is connected through the jack plugs and conductor 155 to the movable contact of the switch 29. Terminal P–2 is connected via conductor 156 to the primary windings 26*p* of zeroing transducer 26. The other side of these windings is connected via conductor 157 to the primary windings 22*p*, 21*p* and 20*p* of the balancing transducers. The other sides of the primary windings of the balancing transducers are respectively connected to the fixed terminals in the upper portion of switch 29. Thus, depending upon how the switch 29 is thrown, any one of the primary windings of the balancing transducers may be connected in the null circuit.

The terminal S–2 is interconnected via conductor 158, the jack plugs 152 and 149, to the secondary windings 23*s* of control transducer 23. The other side of these secondary windings is connected via the jack plugs and conductor 159 to the movable terminal of the lower part of switch 29. Terminal S–1 is connected via conductor 160 to the secondary windings 26*s* of zeroing transducer 26. The other side of these windings is connected via conductor 161 to the secondary windings 22*s*, 21*s* and 20*s* of the balancing transducers. The other sides of these secondary windings are respectively interconnected to the fixed terminals on the lower part of switch 29. Depending upon how the switch is thrown, any one of the secondary windings of the balancing transducers may be connected in the null circuit.

As has been mentioned heretofore, the resultant of the voltages appearing across the secondary terminals of the control transducer and the selected balancing transducer is amplified. The amplifier circuit is not shown, as the details of the same are well-known to those skilled in the art. However, the input to the amplifier is connected across terminals S–1 and S–2 while the output is connected across terminals M–1, M–2, these latter terminals being connected to control phase 8*b* of the servomotor 8.

The null circuit associated with the pen will next be described.

The receptacle 148 is directly connected to the power switch 141 and when this switch is closed, power is fed to terminals *l*–1, *l*–2 on amplifier 61. When standby switch 140 is closed, power is fed directly to winding 40*a* of servomotor 40. Power from terminals *l*–1, *l*–2 is fed via a stepdown transducer (not shown) to primary terminals *p*–1, *p*–2. These terminals supply a constant voltage to the primary windings of the various transducers in the pen null circuit.

Terminal *p*–1 is interconnected via conductor 162 and jack plug 150 to primary windings 55*p* of control transducer 55. The other side of these primary windings is connected via jack plug 150 and conductor 163 to the movable terminal on the bottom portion of switch 62. Terminal *p*–2 is connected via conductor 164 to the primary windings 58*p* of zeroing transducer 58. The other side of the windings is connected via conductor 165 to the primary windings 52*p*, 53*p* and 54*p* of the balancing transducers 52, 53 and 54. The other sides of the primary windings of these balancing transducers are respectively connected to the fixed terminals on the lower portion of the switch 62. Thus, depending upon how the switch is thrown, any one of the primary windings of the balancing transducers may be connected in the null circuit.

Terminal *s*–2 is connected via conductor 166 and jack plug 150 to the secondary windings 55*s* of control transducer 55. The other side of these primary windings is connected via conductor 167 to the movable terminal in the upper portion of switch 62.

Terminal *s*–1 is connected via conductor 168 to the secondary windings 58*s* of zeroing transducer 58. The other side of these secondary windings is connected via conductor 169 to the secondary windings 52*s*, 53*s* and 54*s* of balancing transducers 52, 53 and 54. The other sides of these secondary windings are respectively connected to the fixed terminals in the upper portion of switch 62. Depending upon how the switch is thrown, any one of the secondary windings of the balancing transducers may be selected for operation in the null circuit.

The resultant of the voltages appearing across the secondary windings of the control transducers and the selected balancing transducer is fed from terminals *s*–1 and *s*-2 to an amplifier, the output of which is connected to terminals *m*–1, *m*–2 and fed from these terminals to the control phase 40*b* of servomotor 40.

Some typical applications of the unit of the invention will next be described.

Figure 7:
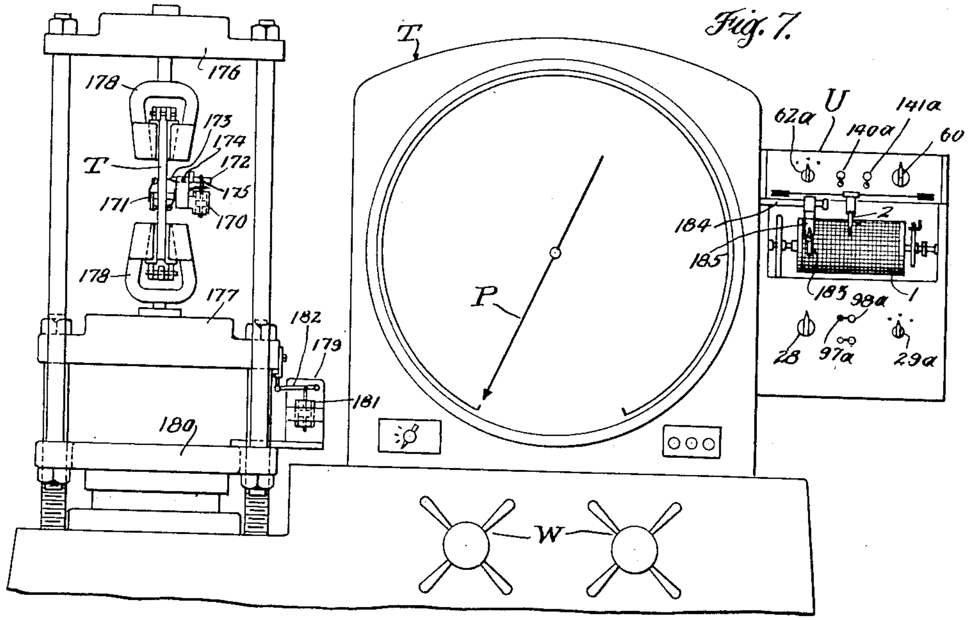

Figure 7 shows a typical setup for recording a unit strain v. total strain curve employing a testing machine T, such as disclosed in my copending application, Serial No. 230,877, filed June 11, 1951, and assigned to the same assignee as the present invention. The control handles W are used to activate certain hydraulic mechanism not shown, which moves cross head 177 upwardly or downwardly. The pointer P indicates the load or stress being applied. The recording unit U shown on the right-hand side of the machine, includes both the recorder and the L-shaped apparatus.

In this arrangement a control transducer 170 is attached to extensometer mechanism 171 mounted on test specimen T. The extensometer has an operating lever 172, the knife edge 173 of which abuts the test specimen. The lever is pivoted at 174 and the core-carrying stem of the transducer is attached to the lever at 175. The lever moves in accordance with the strain in the article and imparts a movement to the core which is proportional to the strain. The test specimen is held between cross heads 176 and 177 by adapters 178—178.

A strain instrument 179 is attached between movable cross head 177 and fixed base 180. The instrument carries a transducer 181, the core of which is moved through the linkage generally designated by 182. The core in this transducer is displaced in accordance with the total movement of the cross heads.

The signal from the unit strain transducer 170 is fed by connections (not shown) to the jack plug 150 so that the pen 2 moves in accordance with the unit strain. The signal from the transducer 181 is fed to the jack plug 149 so that the drum 1 moves in accordance with the total strain. These connections, of course, may be reversed so that the pen moves in accordance with the total strain, while the drum moves in accordance with the unit strain.

With the aforementioned testing machine a curve showing the stress being applied may be taken by pen 183 attached to rod 184 by adapter 185, which is driven in accordance with stress in a manner described in my copending application, Serial No. 230,877.

Figure 8:
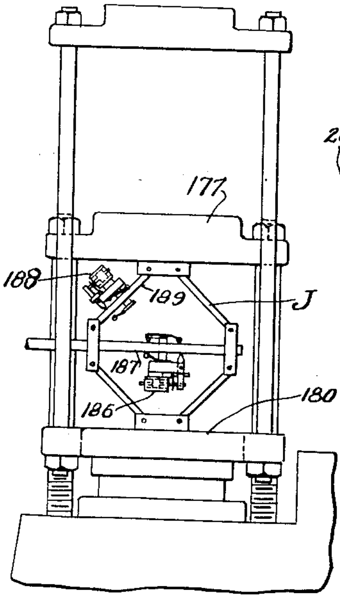

Figure 8 shows a typical example of a setup for plotting a strain v. strain curve, for example, strains in compression of two component parts. In this instance the same machine as described in connection with Figure 7 is used and an automobile jack J is placed between the movable cross head 177 and the base 180. A control transducer 186 is secured to the operating rod 187, while a control transducer 188 is secured to the leg 189. When the cross head 177 is moved downwardly, the jack is put under compression and the strain in compression of rod 187 is picked up by the transducer 186, while the strain in compression of the leg 189 is picked up by the transducer 188. The signals developed by these transducers are fed to the unit U in a manner already described.

Figure 9:
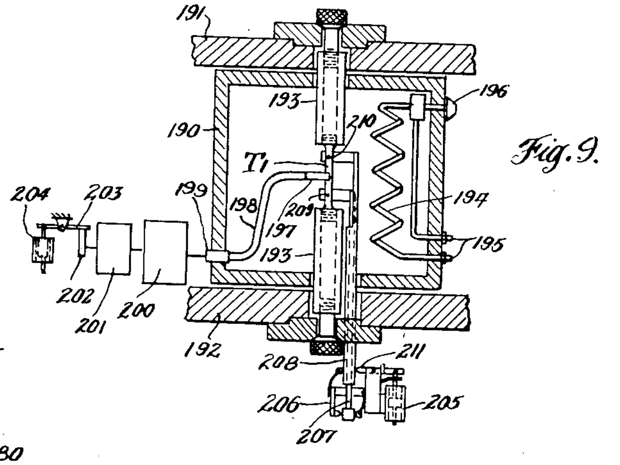

Figure 9 shows a typical setup for recording a temperature v. strain curve. An insulated box 190 is disposed between stationary cross head 191 and movable cross head 192. A test specimen T–1 is also suspended within the box between the cross heads by the adapter mechanisms 193—193. The box is provided with a heating unit 194 having power terminals 195 and thermostat control 196. A thermocouple 197 to measure the temperature of the specimen is connected to the outside of the box through lead wires 198 and jack plug 199. The signal from the thermocouple may be adapted to drive a control transducer as follows. The signal appearing at the jack plug 199 is fed to an amplifier 200 for amplifying the same and then the amplified signal is used to drive a motor 201, which operates a cam 202 having cam follower 203, which displaces the core of transducer 204.

The strain in the test specimen T–1 is measured by control transducer 205 operated by extensometer mechanism 206. This mechanism is secured to a rod 207 inside of tube 208, the rod being secured to the test specimen at 209 and the tube being secured to the test specimen at 210. The operating lever 211 of the extensometer abuts the tube 208.

The signals developed by the transducers 204 and 205 are fed to the desired jack plugs on the unit U in a manner already described.

Figure 11:
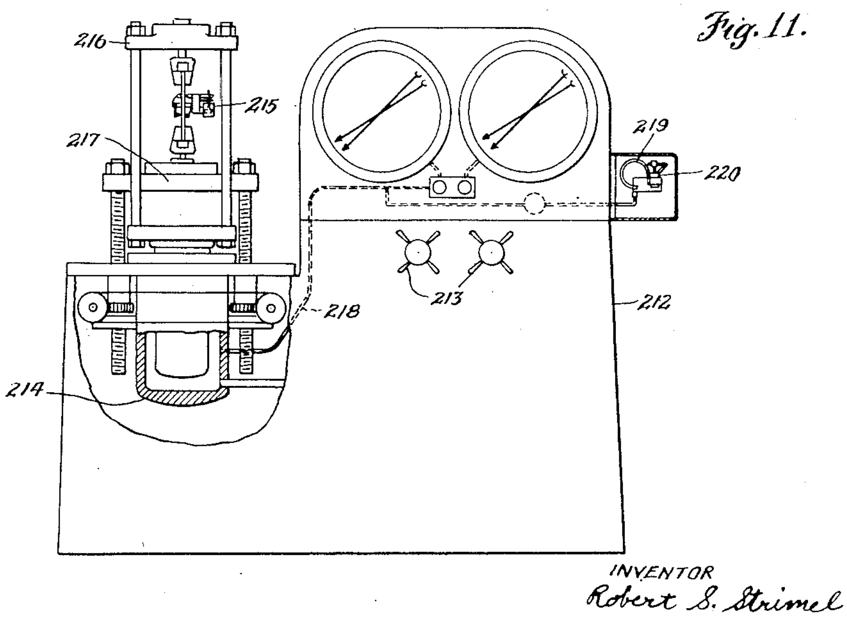
Figures 7, 8, 9, 10 and 11 are more or less diagrammatic views illustrating various applications of my invention.

Apparatus by which stress-strain curves may be plotted utilizing the unit of the present invention is shown in Figure 11. A testing machine 212 is equipped with handles 213 for operating hydraulic load applying mechanism generally indicated by the numeral 214. A signal transducer 215 is connected between cross heads 216 and 217 in a manner indicated in the description of Figure 7. The transducer develops a signal in accordance with the strain of the article. The hydraulic mechanism is connected by a line 218 to a Bourdon tube 219, which operates control transducer 220, to develop a signal in accordance with the stress being applied.

The signal from transducer 215 is used to drive the drum in accordance with the strain, while the signal from transducer 220 is used to drive the pen in accordance with the stress being applied.

With such a setup, the balancing transducers 52, 53 and 54 may be used to indicate changes in range of stress. For example, a testing machine may be set up to apply a maximum load of 60,000 p. s. i. to a test specimen. In such a case the selector switch 62 is set at position H to interconnect the balancing transducer 52 for operation in the null circuit. As load is applied, the pen is driven from left to right (as viewed in Figure 2) until at 60,000 p. s. i. full traverse of the drum surface or full scale deflection is completed. Now, if another specimen is to be tested at 30,000 p. s. i. maximum, the new specimen and the control transducer are inserted on the cross heads. The selector switch 62 is turned to position M to interconnect balancing transducer 53 for operation. As the load is applied, the pen is driven from left to right until at 30,000 p. s. i. full scale deflection of the pen is completed.

It will be apparent that a wide variety of range changes are possible depending upon the load capacity of the testing machine, the calibration of the transducers and the radial distances of the transducers from the rod 43.

Figure 10:
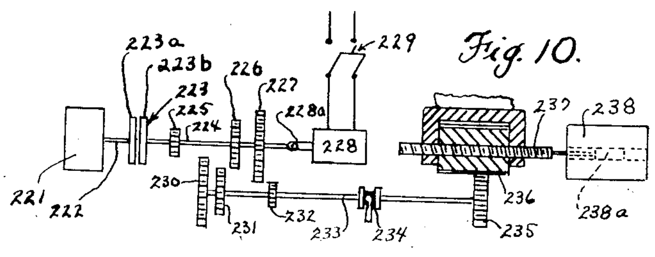

Figure 10 illustrates a typical setup to strain or to stress an article at a certain desired rate.

The synchronous motor 221 has a shaft 222, to which is attached plate 223a of clutch 223. The plate 223b is attached to shaft 224, which also carries gears 225, 226 and 227 and is secured to the plunger 228a of solenoid 228. When the switch 229 is closed, the solenoid engages the clutch.

Gears 230, 231 and 232 are secured to shaft 233 and may be selectively engaged with gears 225, 226 and 227 by operation of actuating mechanism 234. The shaft 223 also carries gear 235, which meshes with gear 236, which operates screw 237. It will be apparent that as the screw 237 is moved, the core 238a of transducer 238 is displaced.

The synchronous motor is driven at a known speed and the gearing is such that the core 238a may be displaced at selective rates. The signal from the transducer 238 is used to drive the pen across the drum. It will be apparent that depending upon the gear ratio and the particular balancing transducer connected in the null circuit associated with the pen, the pen may be moved fully across the surface of the drum in different units of time.

Thus, having a mechanism which moves the pen across the drum at known rates, for example, two minutes, one minute and one-half minute, two master charts are prepared, one having stress-time axes and the other having strain-time axes. On these charts a family of master lines may be drawn having the desired strain/time and stress/time slopes.

One of the charts, say the strain chart, is placed on the drum (which is rotated in accordance with strain), the timing mechanism energized and simultaneously load is applied in a manner so that the pen follows the selected master line. Thus, the specimen is strained in a known amount in a known time. In this instance where the unit is used with the testing mechanism of my copending application, Serial No. 230,877, a load axis may be incorporated along with the time axis and the auxiliary pen used to simultaneously record the stress being applied.

Where stress-time is desired, the stress chart is used, the drum rotated in accordance with stress and the load applied so that the pen follows the selected master line.

I claim:

1. Apparatus for use with a recorder having a housing with a rotatable drum disposed at the front thereof, mechanism within the housing for rotating the drum, the housing having a top and a back arranged in the shape of an L, the apparatus comprising: a box like casing having a foot portion and a leg portion arranged in the shape of an L adapted respectively to fit over and cooperate with the top and back of the recorder whereby to mount the apparatus on the recorder; a movable recording pen mounted on the front of said foot portion and adapted for movement over the surface of the drum when the apparatus is mounted on the recorder; drive mechanism disposed in said leg portion for operating the pen including a movable wire mounted on two pulleys connected to the foot portion, the pen being disposed on the wire between the pulleys; and a central control station on said foot portion including a plurality of control elements connected with said drive mechanism for controlling the operation thereof.

2. Apparatus to receive a signal and register the same for use with a recorder having a housing with a rotatable drum disposed at the front thereof, the housing having a top and a back generally defining an L-shaped portion, the housing further having control means to rotate the drum, the apparatus comprising: a box-like casing having a foot portion and a leg portion, said portion being arranged generally in the form of an L and adapted to fit over and cooperate with the L-shaped portion of the recorder whereby the apparatus is mounted thereon; a pen mounted in said foot portion to register said signal secured to a movable wire arranged on two pulleys arranged to be disposed adjacent opposite ends of the drum when the apparatus is mounted on the recorder; a drive system for moving the wire including a motor mounted in said leg portion and having a field coil, a circuit to operate the motor comprising a plurality of transducers mounted in said leg portion and each having coil and core elements, the coils being selectively connectible with said motor field coil, and means to receive said signal having connections with each of the coils of the transducers and with the motor field coil; mechanism mounted in said leg portion providing for common driving interconnection of one element of each transducer and said wire whereby the respective elements are differently displaced in accordance with the movement of the wire; and switch mechanism mounted on said foot portion for selectively interconnecting the coils of the transducers with the motor coil.

3. Apparatus for recording a signal comprising: a generally L-shaped box-like casing having a foot portion and a leg portion; a movable wire adapted to mount a pen and arranged on two pulleys respectively disposed at opposite sides of the foot portion; a drive system for moving the wire including a motor mounted in said leg portion having a field coil, a rotatable shaft adapted to be driven by the motor connections between the ends of the wire and said rotatable shaft, a circuit to operate the motor comprising a plurality of transducers each mounted in said leg portion each having coil and core elements, the coils being selectively connectible with said motor field coil, and means to receive a signal to be recorded having connections with each of the coils of the transducers and with the motor field coil; connections between one element of each transducer and said rotatable shaft whereby the respective elements are differently displaced in accordance with the movement of the shaft; and switch mechanism mounted on the foot portion for selectively interconnecting the coils of the transducers with the motor field coil.

4. Apparatus for recording a signal comprising: a casing having a foot portion and a leg portion, said portions being arranged in the form of an L and the foot portion having a face; two pulleys mounted adjacent the face of the foot portion; a wire mounted on the pulleys and extending through the foot portion, the wire being adapted to mount a pen or the like; a servomotor mounted in the leg portion, the motor having a field coil and also having a shaft connected with said wire for moving the same; a cam connected with said motor shaft and adapted to be rotated thereby; a cam follower pivotally mounted in said leg portion; spring means to keep the cam and cam follower in engagement; a plurality of transducers mounted in said leg portion each having a coil element and a core element, each core element being connected with said cam follower and adapted to be moved thereby and each coil element being electrically connected with said field coil; connector means to receive a signal to be recorded having electrical connections with said coil; and switch means mounted on said foot portion to selectively electrically connect any of said plurality of coils with said connector means.

5. Apparatus for recording a signal comprising: a casing having a foot portion and a leg portion, said portions being arranged in the form of an L and the foot portion having a face; two pulleys mounted adjacent the face of the foot portion; a wire mounted on the pulleys and extending through the foot portion, the wire being adapted to mount a pen or the like; a servomotor mounted in the leg portion, the motor having a field coil and also having a shaft connected with said wire for moving the same; a cam connected with said motor shaft and adapted to be rotated thereby; a cam follower pivotally mounted in said leg portion; spring means to keep the cam and cam follower in engagement; a plurality of transducers mounted in said leg portion each having a coil element and a core element, each core element being connected with said cam follower and adapted to be moved thereby and each coil element being electrically connected with said field coil; connector means to receive a signal to be recorded having electrical connections with said field coil; a zeroing transducer mounted in said foot portion having a coil element and a core element, the coil being electrically connected with said plurality of coils and the core being connected with an adjustment knob mounted on the face of said foot portion; and switch means mounted on said foot portion to selectively electrically connect any of said plurality of coils with said connector means.

6. For use with a recorder of the type having a housing formed with a top surface and a back surface arranged substanitally normal to the top surface and a rotatable drum mounted in said housing adjacent said top surface, composite recording apparatus adapted to be removably mounted on said recorder comprising: a box like casing having a foot portion and a leg portion said portions being arranged substantially normal to one another; a bottom surface on said foot portion; a side surface on said leg portion, the bottom and side surfaces being adapted respectively to abut said top and back surfaces whereby to mount the apparatus on the recorder; movable pen carrier means mounted on said foot portion and being adapted to support a pen so that the pen is engageable with said drum when the apparatus is mounted on the recorder; control mechanism for moving said carrier and disposed in said leg portion; and drive means extending through said foot portion and operatively interconnecting said carrier and said control mechanism.

7. For use with a recorder of the type having a housing formed with a top surface and a back surface arranged substantially normal to the top surface and a rotatable drum mounted in said housing and disposed adjacent said top surface, composite recording apparatus adapted to be removably mounted on said recorder comprising: a box like casing having a foot portion and a leg portion said portions being arranged substantially normal to one another and the foot portion having a face; a bottom surface on said foot portion; a side surface on said leg portion, the bottom and side surfaces being adapted respectively to abut said top and back surfaces whereby to mount the apparatus on the recorder; a pair of pulleys mounted on said foot portion respectively adjacent opposite ends of said face; a wire mounted on said pulleys and extending in front of said face and through said foot portion, the portion of the wire extending in front of said face being adapted to mount a pen so that the pen is engageable with said drum when the apparatus is mounted on the recorder; control mechanism for moving said wire disposed in said leg portion and having interconnections with the wire; and a plurality of control elements mounted on said foot portion and extending from said face whereby to be manually adjustable, the control elements being interconnected with said control mechanism for affecting the operation thereof.

References Cited in the file of this patent

UNITED STATES PATENTS

| | | |
|---|---|---|
| 1,565,136 | Wright | Dec. 8, 1925 |
| 2,081,598 | Peters et al. | May 25, 1937 |
| 2,091,534 | Templin | Aug. 31, 1937 |
| 2,155,646 | Fetter et al. | Apr. 25, 1939 |
| 2,317,807 | Ryder | Apr. 27, 1943 |
| 2,464,708 | Moseley | Mar. 15, 1949 |
| 2,509,185 | Eckel | May 23, 1950 |
| 2,598,541 | Hill | May 27, 1952 |
| 2,615,936 | Glass | Oct. 28, 1952 |
| 2,621,999 | Alden | Dec. 16, 1952 |